United States Patent [19]
Saiki

[11] Patent Number: 6,068,075
[45] Date of Patent: May 30, 2000

[54] SADDLE BAG PROTECTOR OF MOTORCYCLE

[75] Inventor: Terunari Saiki, Saitama, Japan

[73] Assignee: Honda Giken Kogyo Kabushiki Kaisha, Tokyo, Japan

[21] Appl. No.: 08/820,891

[22] Filed: Mar. 19, 1997

[30] Foreign Application Priority Data

Mar. 19, 1996  [JP]  Japan ................... 8-062222

[51] Int. Cl.$^7$ ..................................................... B62J 9/00
[52] U.S. Cl. ................... 180/219; 280/304.3; 224/413
[58] Field of Search .................. 180/219; 280/304.3; 224/413, 419, 425, 426, 429, 441, 442, 433, 434, 435

[56] References Cited

FOREIGN PATENT DOCUMENTS 1-161889  11/1989  Japan .

*Primary Examiner*—Kevin Hurley
*Attorney, Agent, or Firm*—Birch, Stewart, Kolasch & Birch, LLP

[57] ABSTRACT

In a motorcycle having a saddle bag provided at least on one side of a rear wheel, the saddle bag is supported on the body frame and protected using a reduced number of required parts, thus increasing design freedom. A guard pipe extends outside beyond the saddle bag and is mounted to the body frame. At least a portion of the saddle bag is fixedly supported by the guard pipe.

19 Claims, 8 Drawing Sheets ent of FIG. 3; and

SADDLE BAG PROTECTOR OF MOTORCYCLE

BACKGROUND OF THE INVENTION

1. Field of the Invention

This invention relates to a saddle bag protector for motorcycles having a saddle bag at least on one side of the rear wheel.

2. Description of the Background Art

Conventionally, a motorcycle having a saddle bag has been known as disclosed in Japanese Patent Laid-Open Hei No. 1-161889.

The above-mentioned conventional saddle bag is merely supported by a saddle bag frame fixed to a body frame, and has no saddle bag protecting means. A motorcycle provided with a body frame which has a guard pipe for protecting the body including an engine has been realized. It is possible to make use of such a guard pipe as a bumper in order to protect a saddle bag. However, if conventional guard pipe is used as it is, guard pipe is required in addition to a saddle bag supporting structure. Such a requirement inevitably results in an increased number of required parts and limited design freedom of the vehicle body.

SUMMARY OF THE INVENTION

The present invention has been developed in view of the above problems. An object of the present invention is to provide a saddle bag protector for a motorcycle in which a saddle bag is supported by a body frame and protected with a reduced number of required parts, thereby maximizing design freedom.

To achieve the above-mentioned object, an embodiment of the invention includes a saddle bag protector for a motorcycle having a saddle bag located at least on one side of the rear wheel, in which a guard pipe projecting outward beyond the saddle bag is mounted to the body frame and at least a portion of the saddle bag is fixedly supported by the guard pipe.

A further embodiment of the invention includes a saddle bag protector in which the guard pipe extends forward beyond the saddle bag and includes a forward extending pipe connected at the front end thereof to the body frame. A pillion step is mounted to the forward extending pipe in addition to the structure of the above-mentioned first embodiment.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein.

DETAILED DESCRIPTION OF THE PREFERRED EMBODIMENTS

Figure 1:
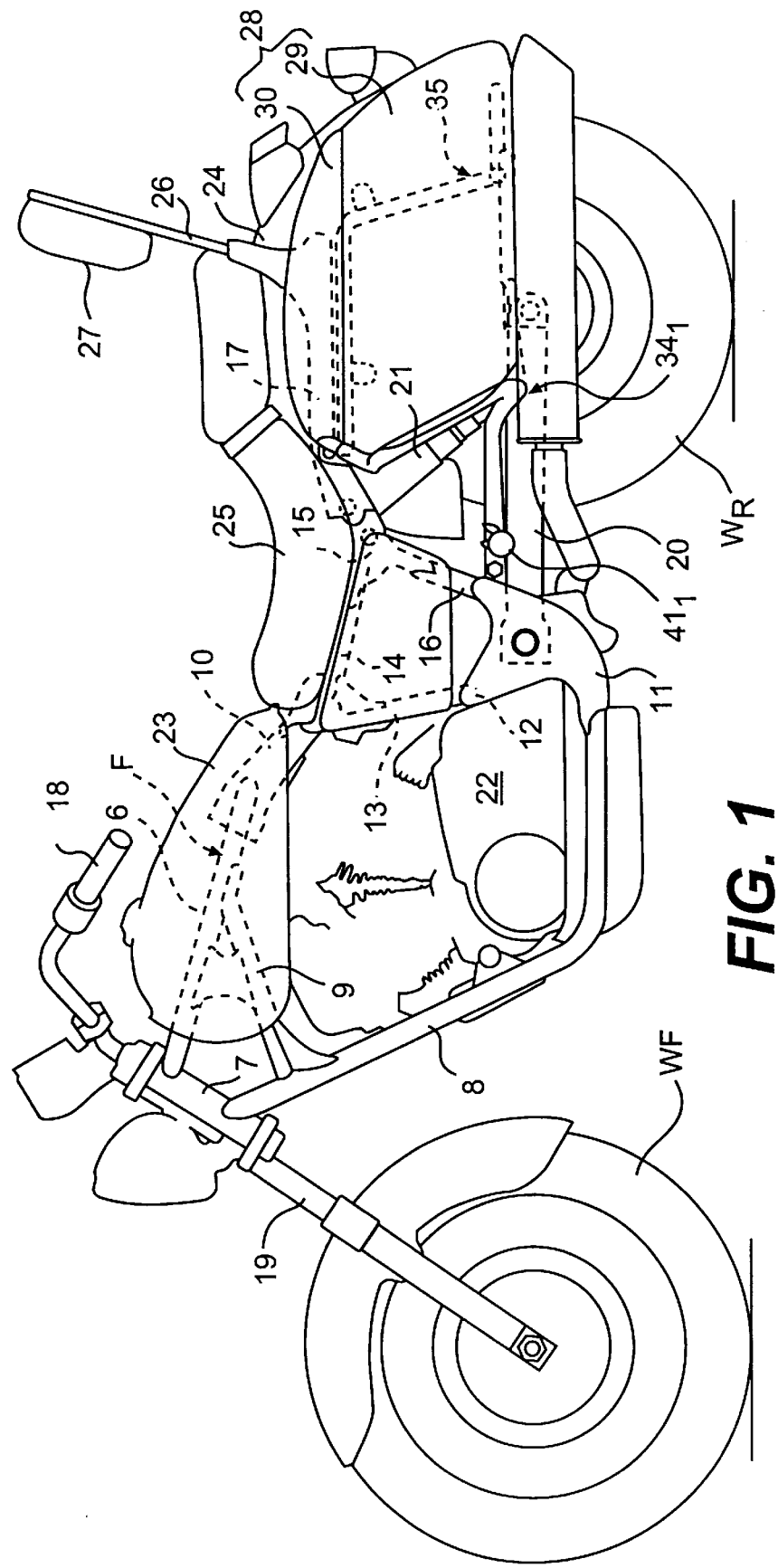
FIG. 1 is a side view of a motorcycle.
Figure 2:
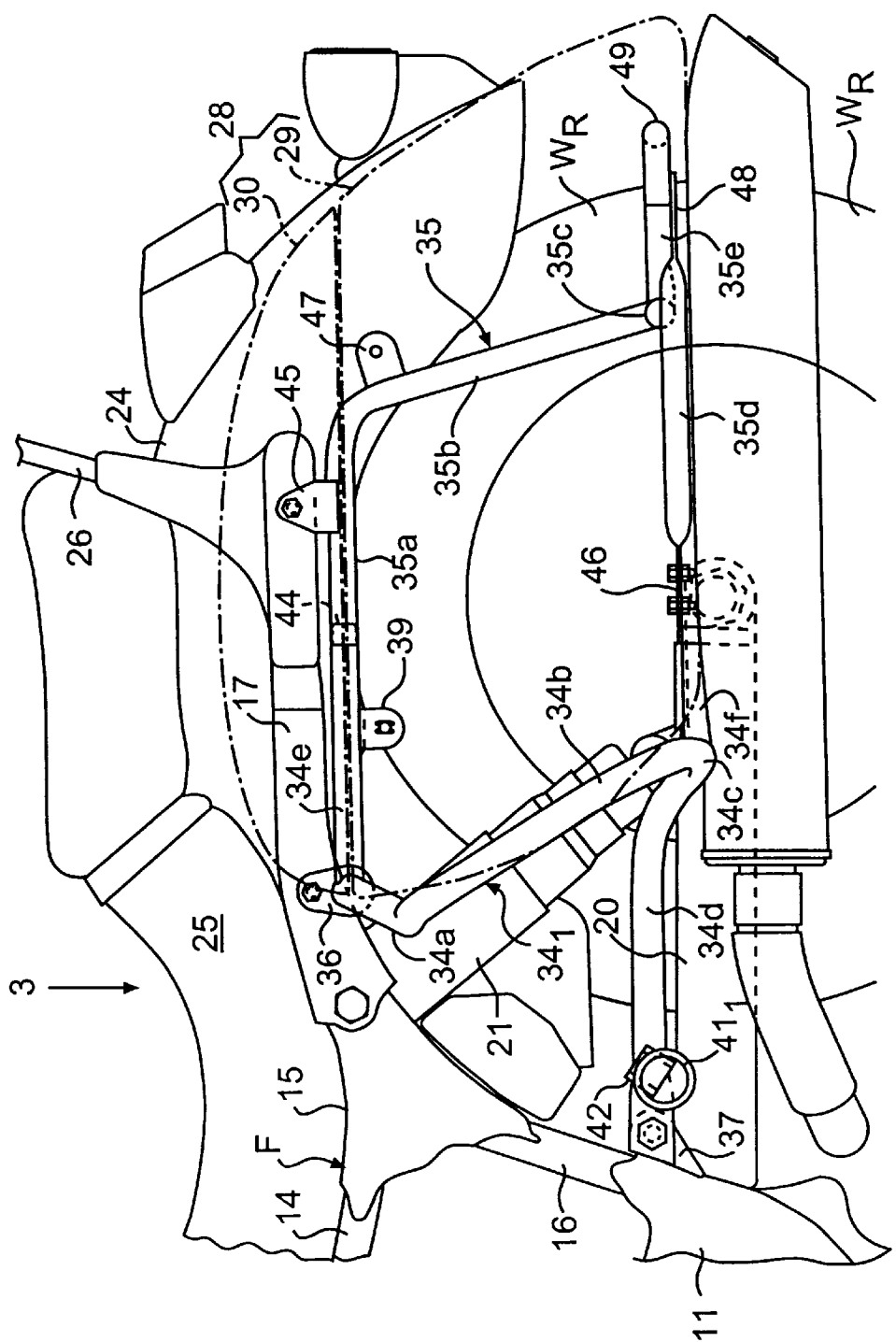
FIG. 2 is an enlarged side view of the rear portion of a motorcycle from which a saddle bag is omitted.
Figure 3:
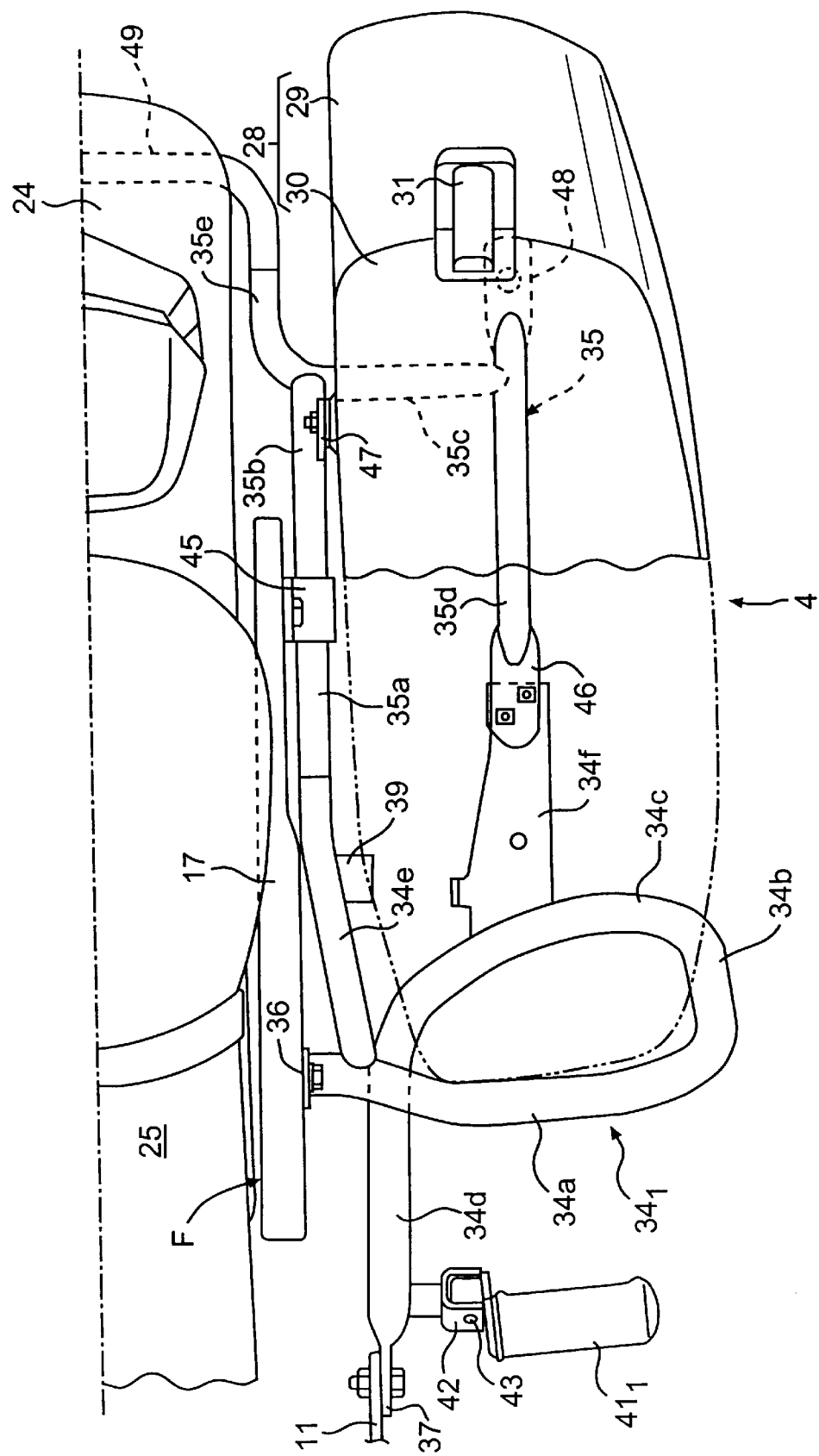
FIG. 3 is a cutaway plan view in the direction of arrow 3 in FIG. 2.
Figure 4:
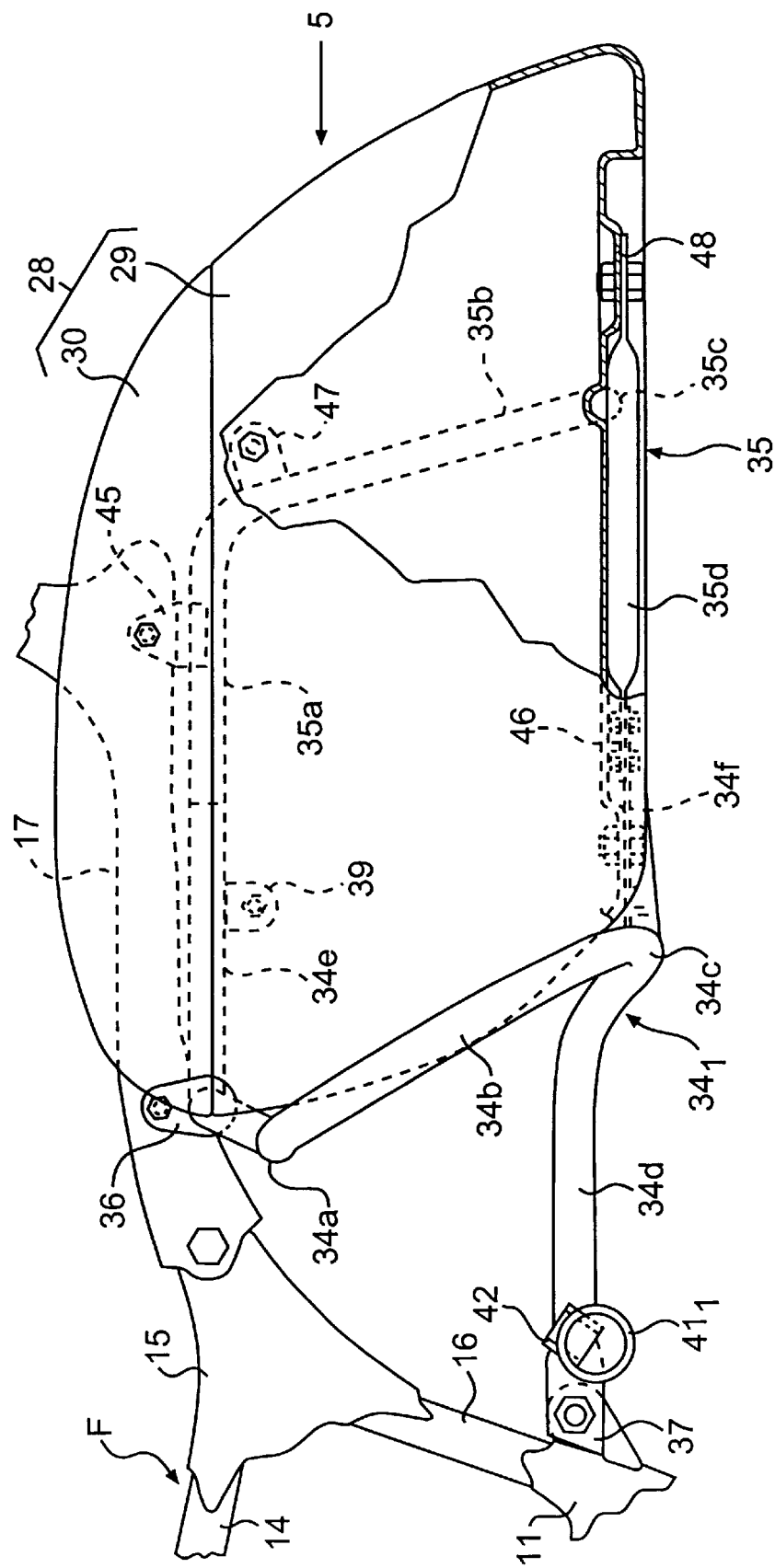
FIG. 4 is a cutaway side view in the direction of arrow 4 in FIG. 3.
Figure 5:
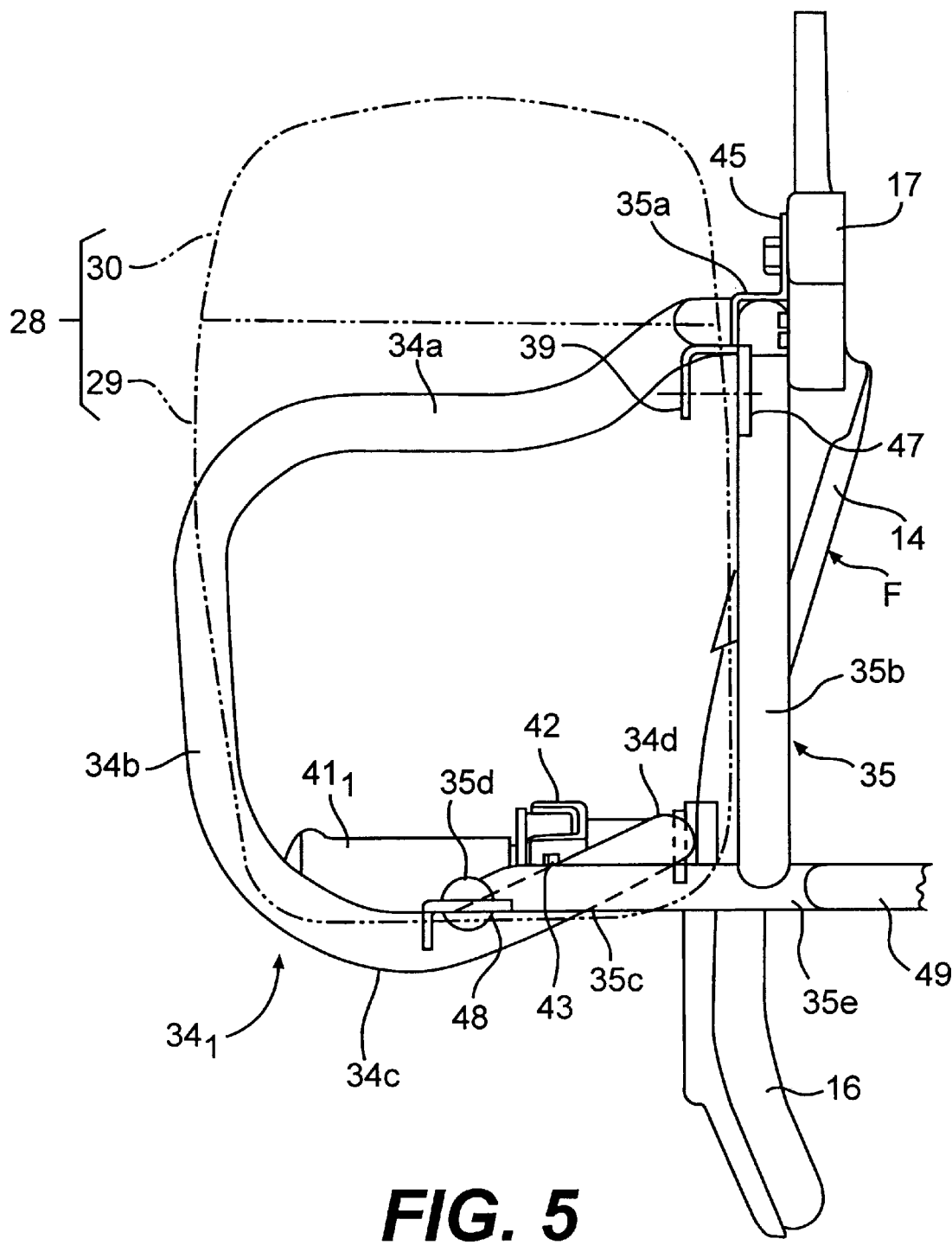
FIG. 5 is a back view in the direction of arrow 5 in FIG. 4 from which a saddle bag is omitted.
Figure 6:
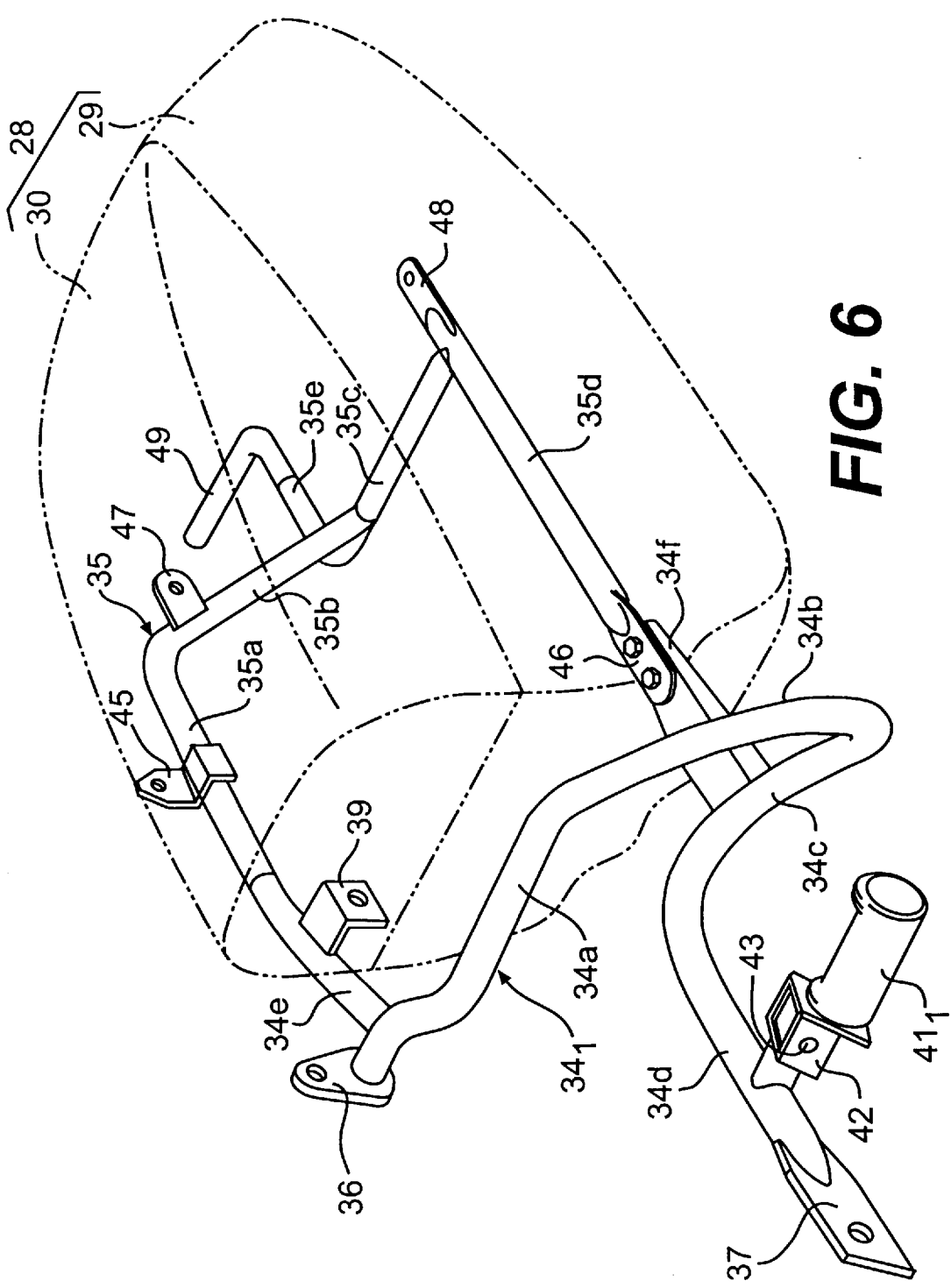
FIG. 6 is a perspective view of a guard pipe and saddle bag frame.

In FIG. 1, the body frame F of the motorcycle is provided with a pair of main tubes 6 extending forward and upward in the form of a curve expanding to both right and left sides of the motorcycle. A head pipe 7 is connected to the front ends of main tubes 6. A pair of down tubes 8 extend back and downward in the form of a curve expanding to both right and left sides of the motorcycle under the bottom of main tubes 6. Reinforcing pipes 9 connect between main tubes 6 and down tubes 8, respectively. Gusset 10 is commonly connected to the rear ends of both main tubes 6, respectively. A pair of right and left connecting frames 11 are respectively connected to the rear ends of both down tubes 8. A cross member 12 is connected between the upper portions of both connecting frames 11. A pair of right and left pillars 13 connect between the rear of the gusset 10 and both ends of the cross member 12. A pair of right and left seat rails 14 extend backward from gusset 10. A pair of right and left connect frames 15 connect to the rear of respective seat rails 14. Back stays 16 connect between connecting frames 11 and 15. A pair of right and left rear stays 17 extend backward from connecting frames 15.

A front fork 19 for steering by operation of steering handles 18 is supported by head pipe 7. A front wheel $W_F$ is supported at the bottom end of front fork 19. The front end of swing arms 20 are swingably supported by connecting frames 11. A rear wheel $W_R$ is supported at the rear end of swing arms 20. Rear cushions 21 are provided between connecting frames 15 and swing arms 20.

A power unit 22 comprising an engine and transmission is mounted to body frame F between front wheel $W_F$ and rear wheel $W_R$. Power from power unit 22 is transmitted to rear wheel $W_R$ through the transmission mechanism built in swing arm 20. A fuel tank 23 is provided across main tubes 6 and gusset 10 of body frame F. A riding seat 25 is provided above rear fender 24 fixedly supported by rear stays 17 and covers rear wheel $W_R$ and seat rail 14. The bottom end of grab rail 26, which is formed as a U-shaped member crossing over rear fender 24, is fixed to the rear of the pair of right and left rear stays 17. A back rest 27 is fixed to the upper front face of grab rail 26.

Referring FIG. 2 to FIG. 6, saddle bags 28, each of which comprises a box 29 having an upward opening and a lid 30 hinged to the front top of box 29 for opening and closing the opening at the top of box 29, are located on both sides of rear wheel $W_R$. A lock 31 is provided between the rear of box 29 and lid 30. The front of box 29 of each saddle bag 28 is fixedly supported by a guard pipe $34_1$ fixed to body frame F. The rear of the box 29 is fixedly supported by a bag frame 35 fixed to body frame F.

Guard pipe $34_1$ comprises a forward extending pipe 34a, the inside end of which is connected to the front of rear stay 17 of body frame F. Forward extending pipe 34a extends outward from rear stay 17 at the front of saddle bag 28. A side pipe 34b is inclined back and downward from the outer end of forward extending pipe 34a along the front side of saddle bag 28. A bottom rounding pipe 34c extends roundward from the bottom end of side pipe 34b to the front bottom of saddle bag 28. A forward extending pipe 34d extends forward from bottom rounding pipe 34c and is fixed at the front end thereof to connecting frame 11 of body frame F. A front top supporting pipe 34e extends backward from the inside end portion of forward extending pipe 34a. A front bottom supporting member 34f extends backward from the middle of bottom rounding pipe 34c.

Forward extending pipe 34a, side pipe 34b, bottom rounding pipe 34c, and forward extending pipe 34d are formed by bending a metal pipe. A mounting plate 36 fixed to the inside end of forward extending pipe 34a is fixed to rear stay 17. A mounting plate 37 which is formed by collapsing the front end of forward extending pipe 34d is fixed to connecting frame 11. Front top supporting pipe 34e is formed by welding the front end of the pipe extending in the front-rear direction to the inside end portion of forward extending pipe 34a. Front bottom supporting member 34f is formed by welding the front end of shaped steel extending in the front-rear direction to the middle of bottom rounding pipe 34c.

Side pipe 34b of guard pipe $34_1$, in the state that guard pipe $34_1$ is mounted to rear stay 17 of body frame F and connecting frame 11, projects outside beyond saddle bag 28 and therefore serves as a bumper which protects saddle bag 28 as well as the vehicle body.

A supporting plate 39 for fixedly supporting the front inside of box 29 is fixed to front top supporting pipe 34e of guard pipe $34_1$. The front bottom of box 29 is fixedly supported by front bottom supporting member 34f. Guard pipe $34_1$ serves not only to fixedly support the front of saddle bag 28 but also to protect saddle bag 28.

A bar-type pillion step $41_1$ of guard pipe $34_1$ is rotatably mounted to the middle portion of forward extending pipe 34d which is connected to connecting frame 11 and which extends beyond saddle bag 28. In detail, a bracket 42 is fixed projecting outward from the middle portion of forward extending pipe 34d. Pillion step $41_1$ is rotatably connected to bracket 42 via interposition of a supporting shaft 43. Pillion step $41_1$ is rotatable between a foot rest position projecting outside from bracket 42 and a lifted position extending upward from bracket 42, as may be understood in view of FIG. 1 to FIG. 6.

Bag frame 35 comprises an upper backward extending pipe 35a extending backward following the rear end of front top supporting pipe 34 of guard pipe $34_1$. A rear top supporting pipe 35b is inclined back and downward connected to the rear end of upper backward extending pipe 35a. A connecting pipe 35c extends in the width direction of the motorcycle and has an inside end which is fixed to the bottom end of rear top supporting pipe 35b. A rear bottom supporting pipe 35d extends in the front and rear direction of the motorcycle, approximately perpendicularly connected to the outside end of connecting pipe 35c, and connected at the front end thereof to front bottom supporting member 34f of guard pipe $34_1$. A lower backward extending pipe 35e extends backward and is connected to the inside end of connecting pipe 35c.

Upper backward extending pipe 35a and rear top supporting pipe 35b are formed by bending a metal pipe. An engaging projection 44 (refer to FIG. 2) fixed to the rear end of front top supporting pipe 34e is engaged to the front end of upper backward extending pipe 35a. A mounting plate 45 fixed to the middle portion of upper backward extending pipe 35a is secured to rear stay 17. Mounting plate 46 formed by collapsing the front end of rear bottom supporting pipe 35d is secured to the rear end of front bottom supporting member 34f of guard pipe $34_1$. Further, connecting pipe 35c and lower backward extending pipe 35e are formed by bending a metal pipe. The bottom end of rear top supporting pipe 35b is welded to the inside end of connecting pipe 35c. The outside end of connecting pipe 35c is welded to a rear end portion of rear bottom supporting pipe 35d.

A supporting plate 47 for fixedly supporting the rear inside portion of box 29 of saddle bag 28 is fixed at a portion near a top end of rear top supporting pipe 35b. The rear bottom of box 29 is fixedly supported by supporting plate 48 formed by collapsing the rear end of rear bottom supporting pipe 35d.

Both lower backward extending pipes 35e of bag frames 35 on the both sides of rear wheel $W_R$ are connected to each other via interposition of connecting pipe 49, which detours through the back side of rear wheel $W_R$.

Next, operation of the first embodiment is described hereinafter. Because guard pipes 34 mounted to body frame F project beyond saddle bags 28 provided on both sides of rear wheel $W_R$, guard pipes $34_1$ serve not only to protect the vehicle body including the power unit as a bumper, but also to protect saddle bags 28.

Moreover, because guard pipes $34_1$ fixedly support the front of saddle bags 28, guard pipes $34_1$ serve not only to protect saddle bags 28 but also to support saddle bags 28. The protection and supporting structure for saddle bags 28 is achieved with a minimized number of required parts wherein design freedom of the vehicle body is increased.

Also, since the pillion step $41_1$ is rotatably mounted at the middle portion of forward extending pipe 34d of guard pipe $34_1$, an extra member for mounting of pillion step $41_1$ is not required. The number of required parts is thus reduced further.

Figure 7:
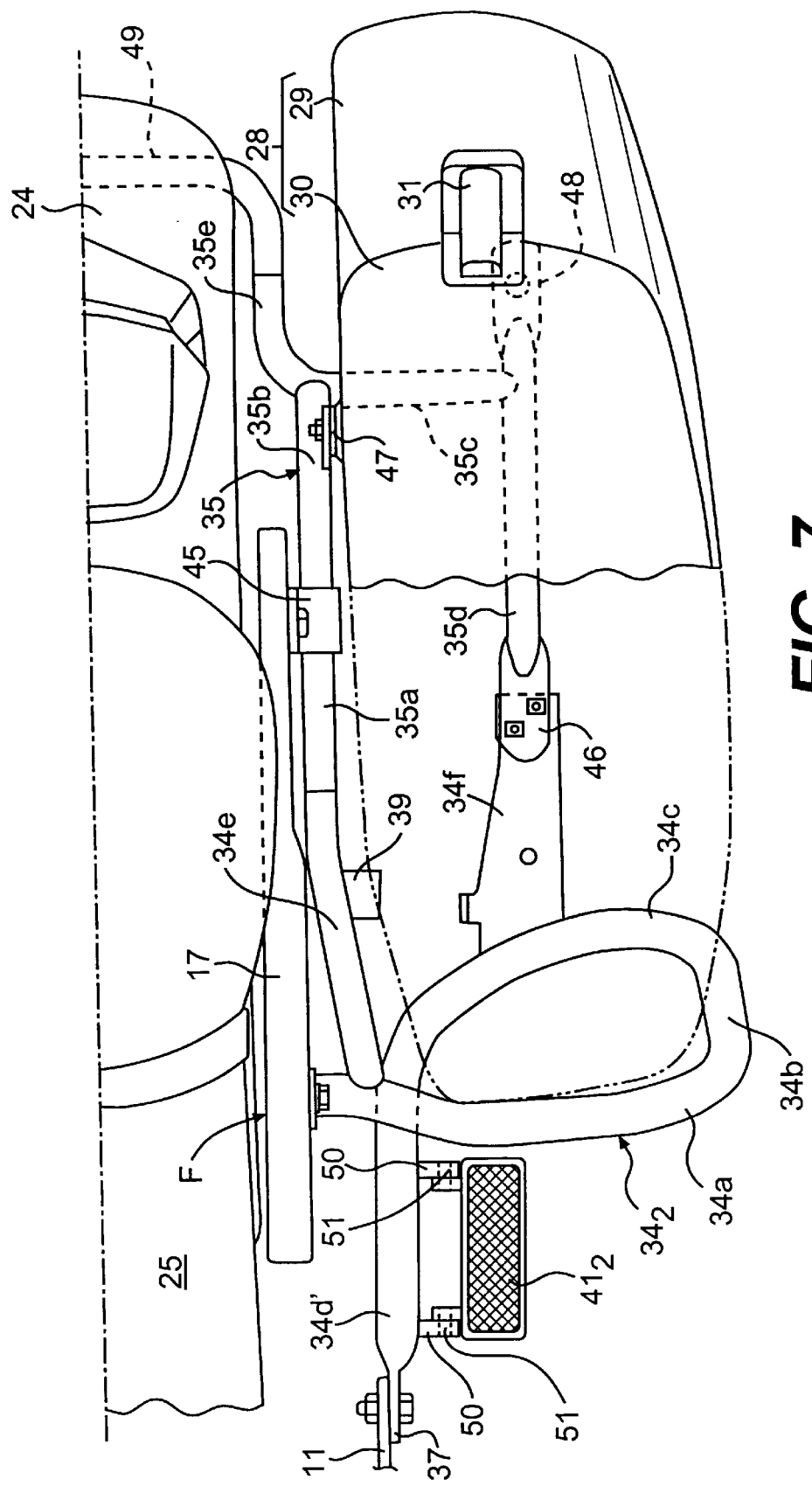
FIG. 7 is a cutaway plan view of an alternative embodiment of FIG. 3.

FIG. 7 shows a second embodiment of the present invention. A board type pillion step $41_2$ is rotatably mounted to the middle portion of forward extending pipe $34d'$ of guard pipe $34_2$ which is mounted to body frame F, guard pipe $34_2$ extending forward and beyond saddle bag 28. A pair of brackets 50 are fixed to the middle portion of forward extending pipe $34d'$ with an interval in a front and rear direction of the vehicle. Pillion step $41_2$ is rotatably connected to brackets 50 via interposition of supporting shafts 51. Pillion step $41_2$ is rotatable between a foot rest position projecting outside from brackets 50 and a lifted position extending upward from brackets 50.

Figure 8:
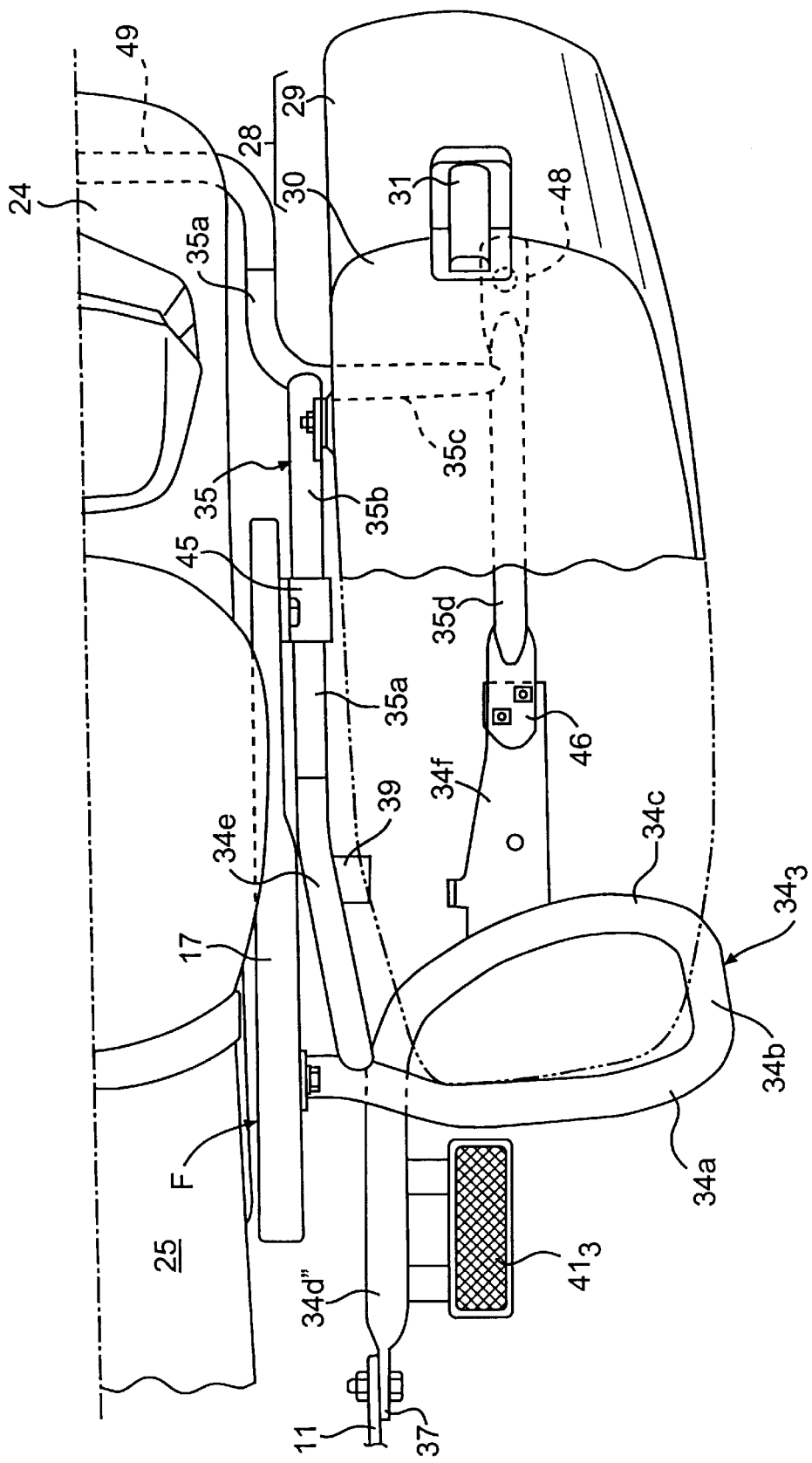
FIG. 8 is a cutaway plan view of a still further alternative embodiment of FIG. 3.

FIG. 8 shows a third embodiment of the present invention. A board type pillion step $41_3$ may be fixed to the middle portion of forward extending pipe $34d''$ of the guard pipe $34_3$ which is mounted to body frame F, guard pipe $34_3$ extending forward and beyond saddle bag 28 as it is projected to the outside from forward extending pipe $34d''$.

According to an embodiment of the invention, because guard pipes projecting outward beyond the saddle bags are mounted to the body frame, and at least a part of the saddle bags are fixedly supported by the guard pipes, the guard pipes serve to support and protect the saddle bags. The saddle bags are thus supported and protected using a reduced number of required parts and the design freedom is increased.

According to a further embodiment of the invention described, because the guard pipes which extend forward and beyond the saddle bags are provided with forward extending pipes connected at the front end thereof to the body frame, the pillion steps can be mounted to the forward extending pipes. Thus, extra members for mounting the pillion steps are not required, further reducing the number of required parts.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle, comprising:
    at least one saddle bag located on one side of a rear wheel of the motorcycle; and
    a saddle bag protector, said saddle bag protector including:
        a guard pipe, said guard pipe mounted to a body frame of the motorcycle and projecting in an outward direction from the body frame beyond the saddle bag, said guard pipe including a bottom supporting member extending in a forward direction of the motorcycle underneath the saddle bag for fixedly supporting at least a lower portion of the saddle bag.

2. The motorcycle of claim 1, wherein said guard pipe extends in a forward direction of the motorcycle beyond the saddle bag and comprises a forward extending pipe having a front end connected to the body frame of the motorcycle, a pillion step being mounted to said forward extending pipe.

3. The motorcycle of claim 2, wherein said pillion step is rotatably mounted to said forward extending pipe to be rotatable to a foot rest position extending in the outward direction from the body frame and a lifted position extending vertically.

4. The motorcycle of claim 2, wherein said pillion step is fixedly mounted to said forward extending pipe.

5. The motorcycle of claim 1, wherein the motorcycle includes an additional saddle bag located on another side of the rear wheel opposite the one side,
    an additional guard pipe is mounted to the body frame of the motorcycle on the other side of the rear wheel and projects in an outward direction from the body frame beyond the additional saddle bag, said additional guard pipe fixedly supporting at least a lower portion of the additional saddle bag.

6. The motorcycle of claim 5, further comprising a connector pipe passing along a rear end of the rear wheel, said connector pipe connecting said guard pipe and said additional guard pipe.

7. The motorcycle of claim 1, wherein said guard pipe comprises an upper supporting member extending in a forward direction of the motorcycle between the saddle bag and the rear wheel, said upper supporting member fixedly mounting the saddle bag.

8. The motorcycle of claim 5, wherein said additional guard pipe comprises a bottom supporting member extending in a forward direction of the vehicle underneath the additional saddle bag for fixedly supporting the additional saddle bag.

9. A saddle bag protector for a vehicle having a saddle bag located on a side of the vehicle, the saddle bag protector comprising:
    a guard pipe mountable to a body frame of the vehicle and for projecting in an outward lateral direction from the body frame beyond the saddle bag,
    said guard pipe including a bottom supporting member for fixedly supporting at least a lower portion of the saddle bag, said bottom supporting member for extending in a forward direction of the vehicle underneath the saddle bag; and
    wherein said guard pipe is extendable in a forward direction of the vehicle beyond the saddle bag and comprises a forward extending pipe having a front end connectable to the body frame of the vehicle, a pillion step being mounted to said forward extending pipe.

10. The saddle bag protector of claim 9, wherein said pillion step is rotatably mounted to said forward extending pipe to be rotatable to a foot rest position extending in the outward lateral direction from the body frame and a lifted position extending vertically.

11. The saddle bag protector of claim 9, wherein said pillion step is fixedly mounted to said forward extending pipe.

12. A motorcycle comprising:
    at least one saddle bag located on one side of a rear wheel of the motorcycle; and
    a saddle bag protector, said saddle bag protector including a guard pipe mounted to a body frame of the motorcycle and projecting in an outward direction from the body frame beyond the saddle bag, said guard pipe including a bottom supporting member extending in a forward direction of the motorcycle underneath the saddle bag, said bottom supporting member fixedly supporting the saddle bag,
    wherein said guard pipe extends in a forward direction of the motorcycle beyond the saddle bag and comprises a forward extending pipe having a front end connectable to the body frame of the motorcycle, a pillion step being mounted to said forward extending pipe.

13. The motorcycle of claim 12, wherein said pillion step is rotatably mounted to said forward extending pipe to be rotatable to a foot rest position extending in the outward direction from the body frame and a lifted position extending vertically.

14. The motorcycle of claim 12, wherein said pillion step is fixedly mounted to said forward extending pipe.

15. The motorcycle of claim 12, wherein the motorcycle includes an additional saddle bag located on another side of the rear wheel opposite the one side,
    an additional guard pipe is mountable to the body frame of the motorcycle on the other side of the rear wheel and projects in an outward direction from the body frame beyond the additional saddle bag, said additional guard pipe fixedly supporting at least a lower portion of the additional saddle bag.

16. The motorcycle of claim 15, further comprising a connector pipe passing along a rear end of the rear wheel, said connector pipe connecting said guard pipe and said additional guard pipe.

17. The motorcycle of claim 12, wherein said guard pipe comprises a bottom supporting member extending in a forward direction of the motorcycle underneath the saddle bag, said bottom supporting member fixedly supporting the saddle bag.

18. The motorcycle of claim 12, wherein said guard pipe comprises an upper supporting member extending in a forward direction of the motorcycle between the saddle bag and the rear wheel, said upper supporting member being fixedly mounted to the saddle bag.

19. The motorcycle of claim 15, wherein said additional guard pipe comprises a bottom supporting member extending in a forward direction of the vehicle underneath the additional saddle bag for fixedly supporting the additional saddle bag.

* * * * *